US009291790B2

(12) United States Patent
Kimbrell et al.

(10) Patent No.: US 9,291,790 B2
(45) Date of Patent: Mar. 22, 2016

(54) FIBER SPLICE ENCLOSURE HAVING REMOVABLE CABLE PORT MOUNTING PLATE

(75) Inventors: Eddie Kimbrell, Dacula, GA (US); Ted Lichoulas, Simpsonville, SC (US); Roger Vaughn, Greer, SC (US); Ray Mouhot, Granbury, TX (US); Rich Cubala, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 13/501,967

(22) PCT Filed: Oct. 14, 2010

(86) PCT No.: PCT/US2010/052673
§ 371 (c)(1),
(2), (4) Date: Aug. 27, 2012

(87) PCT Pub. No.: WO2011/047155
PCT Pub. Date: Apr. 21, 2011

(65) Prior Publication Data
US 2012/0308189 A1    Dec. 6, 2012

Related U.S. Application Data

(60) Provisional application No. 61/251,447, filed on Oct. 14, 2009.

(51) Int. Cl.
*G02B 6/14* (2006.01)
*G02B 6/44* (2006.01)

(52) U.S. Cl.
CPC ............ *G02B 6/4471* (2013.01); *G02B 6/4446* (2013.01); *G02B 6/4452* (2013.01)

(58) Field of Classification Search
CPC .. G02B 6/4441; G02B 6/4446; G02B 6/4452; G02B 6/4455
USPC ........................................... 385/135
See application file for complete search history.

(56) References Cited

U.S. PATENT DOCUMENTS

| | | | | |
|---|---|---|---|---|
| 5,247,603 A * | 9/1993 | Vidacovich et al. | ........... | 385/135 |
| 5,835,657 A * | 11/1998 | Suarez et al. | ................. | 385/135 |
| 6,401,400 B1 * | 6/2002 | Elliott | ................ | 52/20 |
| 6,515,227 B1 | 2/2003 | Massey et al. | | |
| 6,533,472 B1 | 3/2003 | Dinh et al. | | |
| 6,754,844 B1 * | 6/2004 | Mitchell | ................ | 714/4.4 |
| 7,603,020 B1 | 10/2009 | Wakileh et al. | | |
| 7,751,672 B2 * | 7/2010 | Smith et al. | ................ | 385/135 |
| 2004/0013390 A1 * | 1/2004 | Kim et al. | ................ | 385/135 |
| 2006/0021784 A1 * | 2/2006 | Garmong | ............ | 174/100 |
| 2006/0083475 A1 * | 4/2006 | Grubish et al. | ............ | 385/135 |
| 2007/0047895 A1 * | 3/2007 | Parikh et al. | .............. | 385/135 |
| 2007/0086721 A1 | 4/2007 | Dobbins et al. | | |
| 2008/0219633 A1 * | 9/2008 | Smith et al. | ............ | 385/135 |
| 2009/0202205 A1 * | 8/2009 | Conner et al. | ............ | 385/48 |
| 2009/0257726 A1 * | 10/2009 | Redmann et al. | ............. | 385/135 |

OTHER PUBLICATIONS

International Search Report of PCT/US2010/052673, dated Dec. 20, 2010.

* cited by examiner

*Primary Examiner* — Kaveh C Kianni
(74) *Attorney, Agent, or Firm* — Sughrue Mion, PLLC

(57) ABSTRACT

A fiber splice enclosure is provided. The fiber splice enclosure includes an enclosure, a cover, a chassis, and a cable port mounting plate for allowing entry and exit of cables. The cable port mounting plate is removably fastened to the enclosure and the chassis.

10 Claims, 15 Drawing Sheets

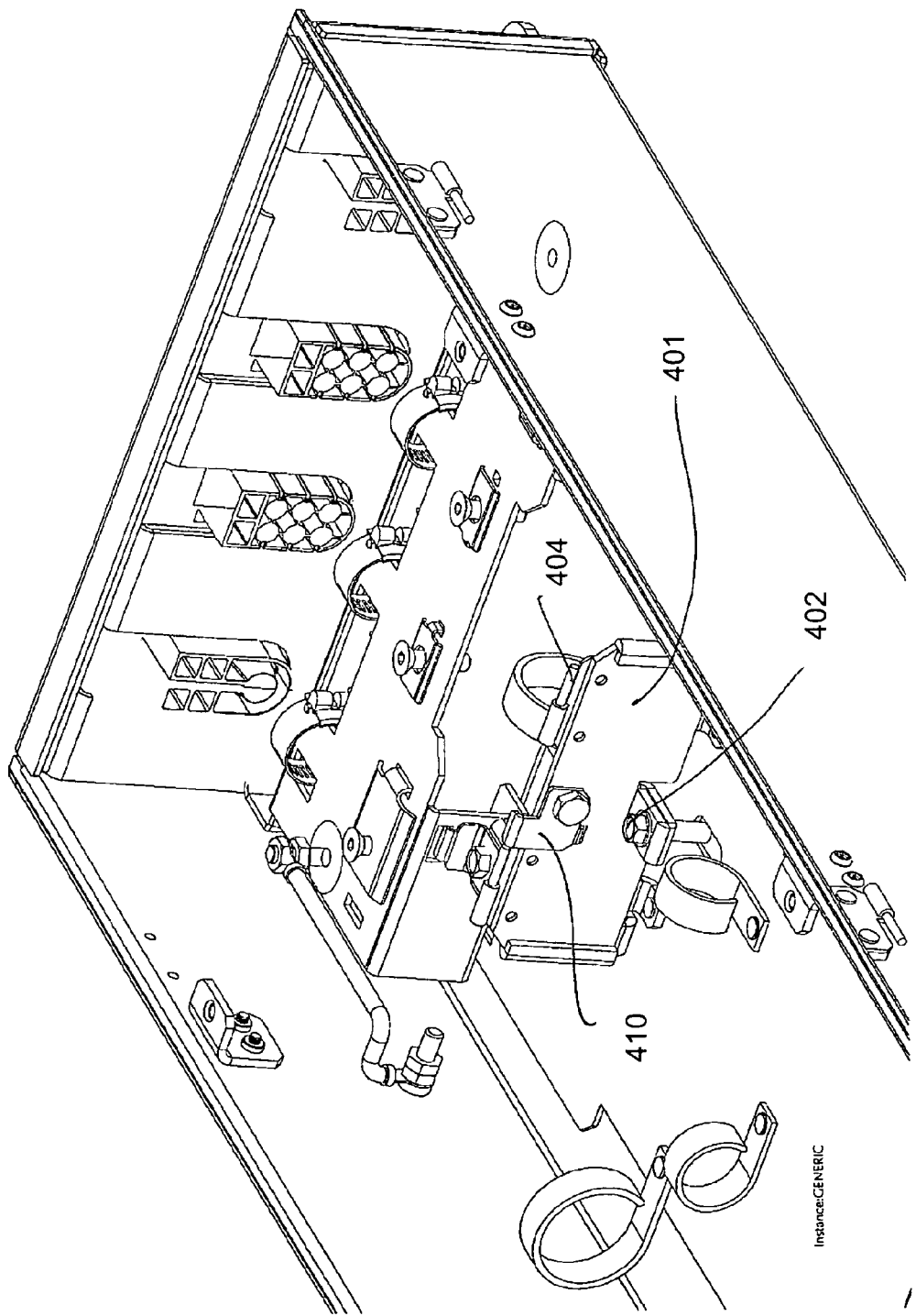

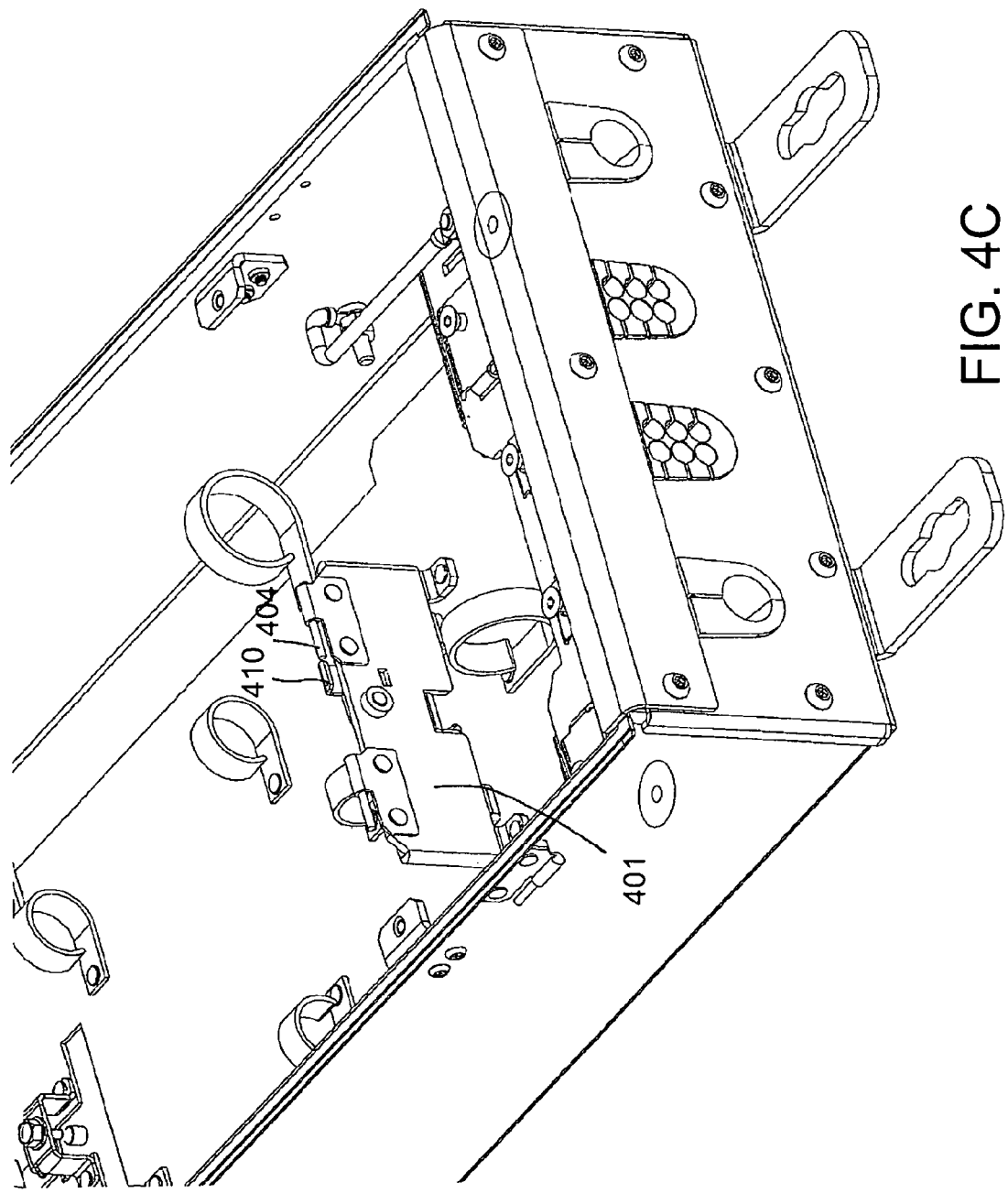

FIBER SPLICE ENCLOSURE HAVING REMOVABLE CABLE PORT MOUNTING PLATE

CROSS-REFERENCE TO RELATED PATENT APPLICATIONS

The present application claims priority from U.S. Provisional Application No. 61/251,447 filed on Oct. 14, 2009, the disclosure of which is incorporated herein by reference in its entirety.

BACKGROUND

1. Field of the Invention

Apparatuses consistent with the present invention relate to enclosures for organizing, splicing, and interconnecting fibers in various applications such as broadband, distribution, and building entrance applications.

2. Description of the Related Art

Throughout this disclosure, a fiber splice enclosure refers to an assembly for splitting cables into constituent fibers and vice-versa. The word 'fiber' does not limit the disclosure to optical fibers. In fact, 'fiber' may refer to a plurality of conductors such as copper wires, optical fibers, metallic conductors, etc. A single cable may include different types of conductors such as copper wires or optical fibers or combinations of both.

Existing fiber splice enclosures available today are designed with a specific set of entry and exit cable ports. An example of such a related art fiber splice enclosure is the LightLink™ LL-500 Optical Splicing & Distribution Enclosure commercially sold by AFL Telecommunication, Inc. These fiber splice enclosures can be mounted to walls or suitable building structures and are used to divide an input entry cable into constituent fibers for distribution to customers. The port locations for entry of the cable and exit of the fibers may be preconfigured or temporarily sealed with knockouts or plugs.

Current technology, however, does not provide means for changing cable port number, position, and geometry for such fiber optic enclosures to fit a dynamic installation environment. Installers are compelled to purchase fixed configuration boxes or settle for sub-optimal installation configurations.

Current technology does not provide a means for replacing the outer skin of the enclosure with out service interruption. In addition, the existing technology does not provide a means to change the door swing angle (left or right) in the field. With existing technology, the installer must make modification to the enclosure and/or add additional mounting hardware.

Existing technology also does not provide a means to field configure the fiber splice connector interconnect mounting bracket without considerable effort and time. Finally, existing technology fit/form factor is large and bulky in size and shape.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems listed above.

According to an exemplary implementation a fiber splice enclosure is provided. The fiber splice enclosure includes an enclosure, a chassis, a cover, and a cable port mounting plate for allowing entry and exit of cables.

BRIEF DESCRIPTION OF THE DRAWINGS

The above and/or other aspects of the present invention will be made more apparent by describing certain exemplary embodiments of the present invention with reference to the accompanying drawings, in which:

FIGS. 4B and 4C illustrate an exemplary hinge assembly for mounting an interconnect bracket assembly to the internal chassis.

DETAILED DESCRIPTION

Figure 1A:
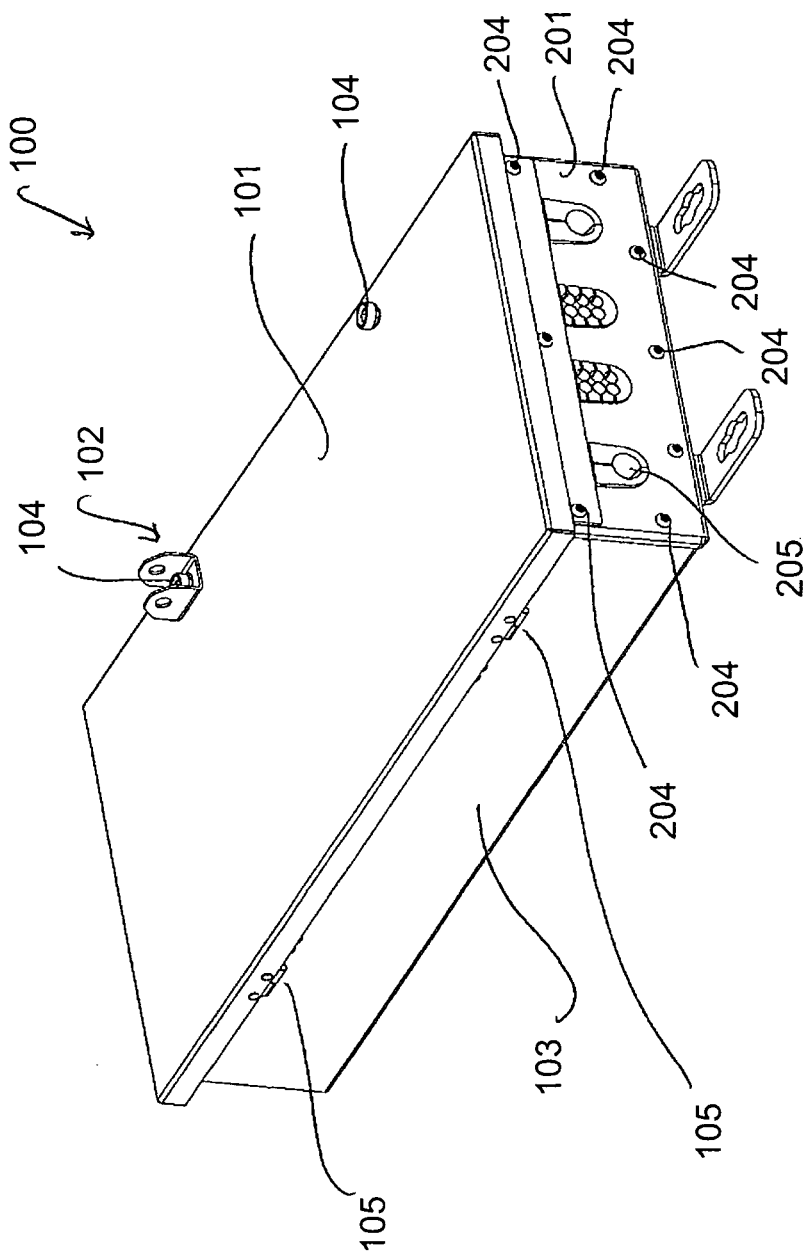
FIG. 1A illustrates a perspective view of an exemplary implementation of a fiber splice enclosure.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1B:
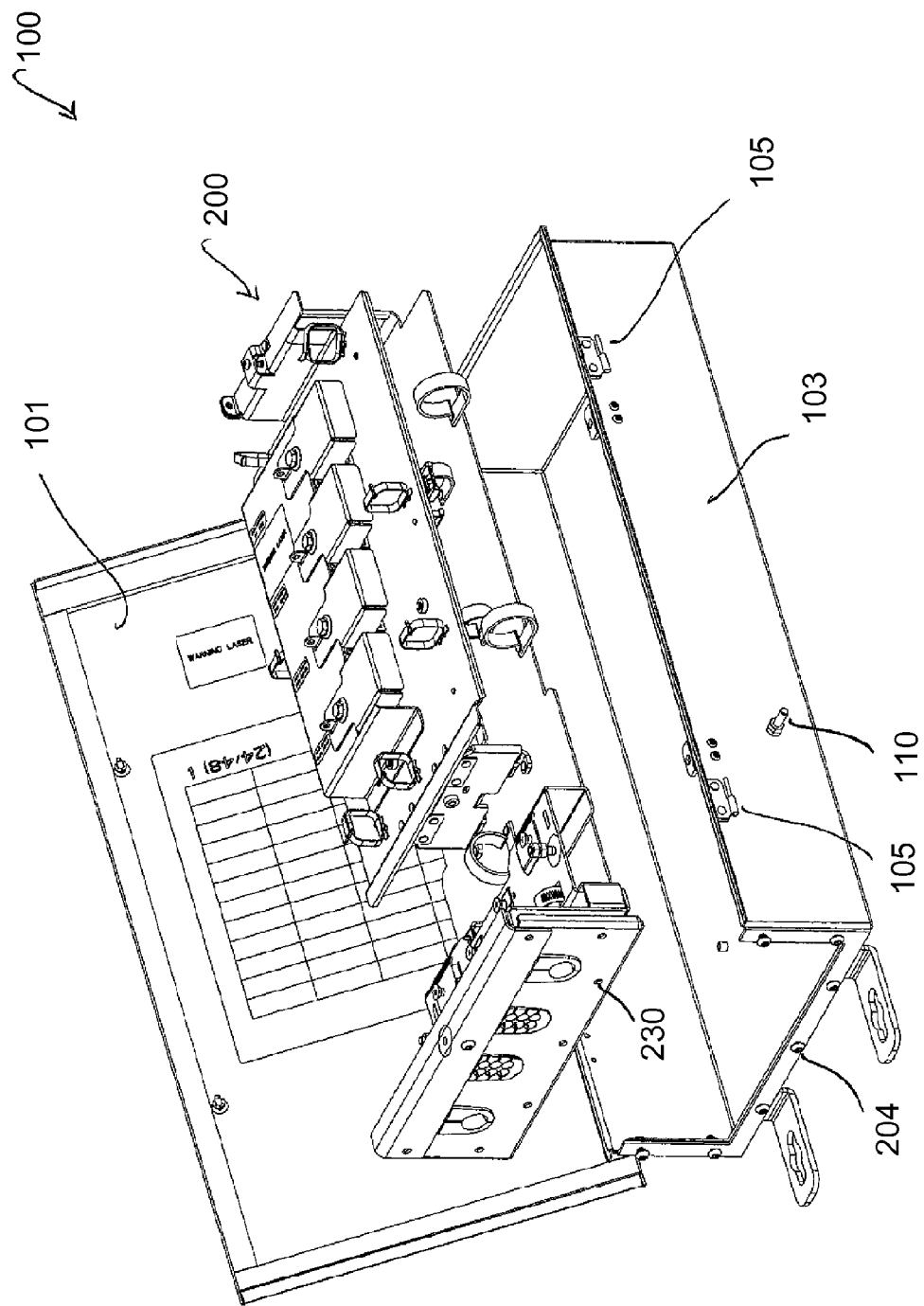
FIG. 1B illustrates another perspective view of an exemplary implementation of the fiber splice enclosure.

Inside the enclosure box 103, an internal chassis 200 (FIG. 1B) is provided, which includes the assembly for splitting an input cable into constituent fibers and/or wire conductors, which are spliced into individual output cables. Similarly, the internal chassis tray 200 can be used to output a single cable by merging the inputs of a plurality of fibers. FIG. 1B illustrate openings 230 in a cable port mounting plate 201, which is mounted to the inner chassis 200. Openings 230 on the cable port mounting plate 201 are used to secure the cable port mounting plate 201 to the box 103 using mounting elements 204. The mounting elements 204 may be screws. It will also be understood from FIG. 1B that hinges 105 may be provided on both sides of the enclosure box 103. The enclosure box 103 may also include grounding element 110. The grounding element 110 may be provided on both sides of the enclosure box 103.

Inside the enclosure box 103, an internal chassis 200 (FIG. 1B) is provided, which includes the assembly for splitting an input cable into constituent fibers and/or wire conductors, which are spliced into individual output cables. Similarly, the internal chassis tray 200 can be used to output a single cable by merging the inputs of a plurality of fibers. FIG. 1B illustrate openings 230 in a cable port mounting plate 201, which is mounted to the inner chassis 200. Openings 230 on the cable port mounting plate 201 are used to secure the cable port mounting plate 201 to the box 103 using mounting elements 204. The mounting elements 204 may be screws. It will also be understood from FIG. 1B that hinges 105 may be provided on both sides of the enclosure box 103. The enclosure box 103 may also include grounding element 110. The grounding element 110 may be provided on both sides of the enclosure box 103.

Figure 2:
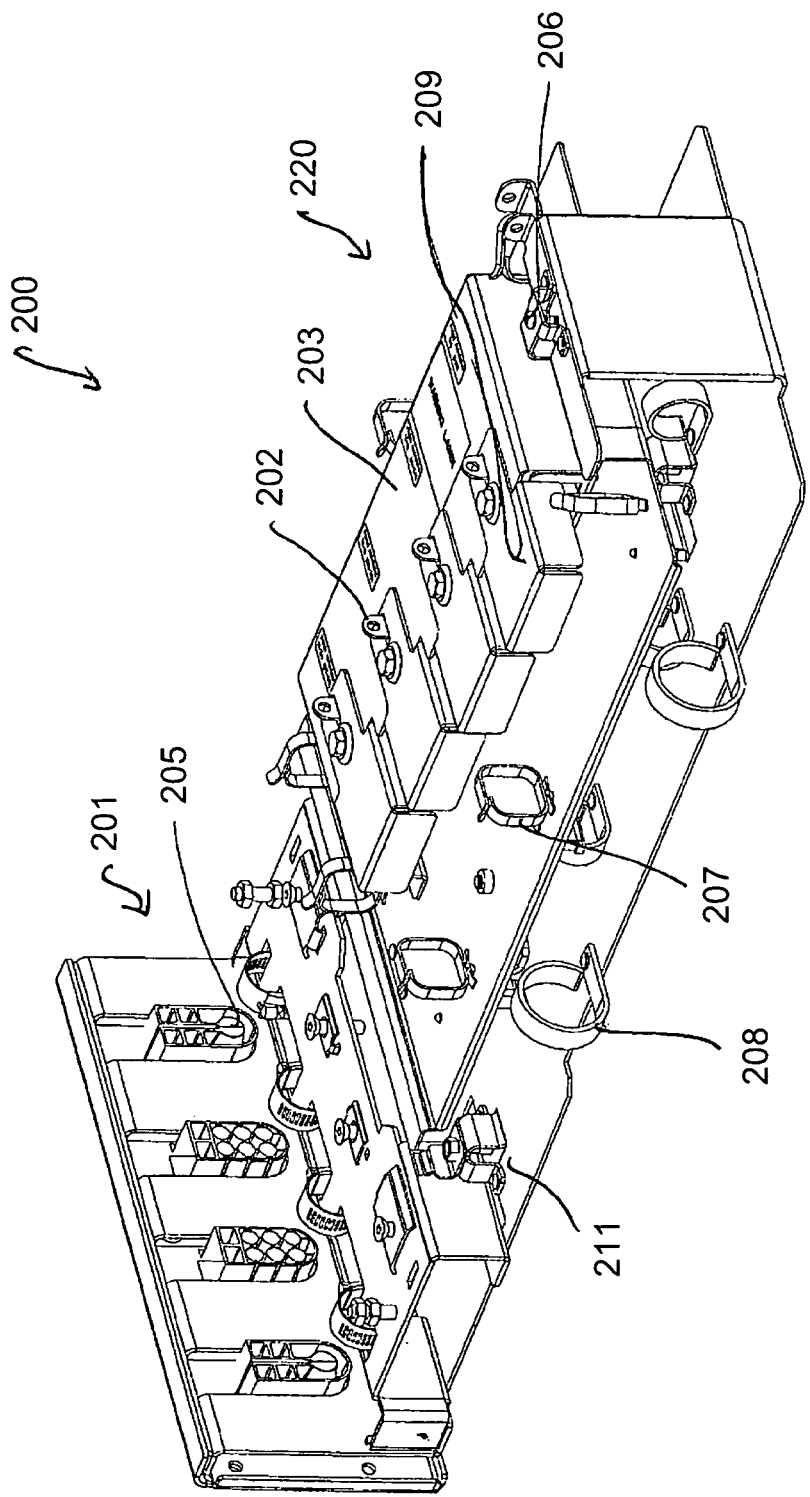
FIG. 2 illustrates a perspective view of an internal chassis of the exemplary fiber splice enclosure box.

Next, a detailed description of the fiber splice enclosure 100 will be provided with reference to FIG. 2, which illustrates a perspective view of the internal chassis 200. The internal chassis 200 includes a plurality of components such as the cable port mounting plate 201, fiber splice interconnect bracket assembly 220, etc. The cable port mounting plate 201 allows entry and exit of cables into the fiber splice enclosure. For example, in FIG. 2 a cable may enter the fiber splice enclosure through one of the entry holes 205 in the cable port mounting plate 201. Each of these holes in the cable port mounting plate 201 may be secured by rubber grommets or other appropriate materials in order to prevent intrusion by weather elements, insects, etc.

The internal chassis 200 is engineered specifically to accept modular pre-engineered cable port mounting plates 201 that are interchangeable as needed for different cable entry schemes. This feature allows installers or end users to utilize a standard box footprint, customize the box for specific installation requirements, minimize box penetrations that will degrade over time, etc.

The internal chassis 200 further includes at least one fiber splice interconnect bracket assembly 220. It should be noted that a plurality of such brackets may be provided. The fiber splice interconnect bracket 220 may be removably attached to the internal chassis 200 such that field personnel may remove the existing bracket and replace it with one of another type without the need for extensive modifications to the unit. The above feature is explained in more detail with reference to FIGS. 4A, 4B, and 4C. The fiber splice interconnect bracket assembly 220 may have other brackets and devices mounted to it for a more comprehensive system. The fiber splice interconnect bracket assembly 220 as shown groups the fiber output cables in an organized and methodical arrangement for adapters and cables. The fiber splice interconnect bracket assembly 220 is explained in further detail later.

The interconnect bracket has a provider cover 203 and a plurality of subscriber covers 209 on the input side and on the output side of service, respectively. These covers are attached with hardware that can only be accessed when the interconnect bracket is open. The fiber splice interconnect bracket assembly 220 is secured to the main chassis by a security screw 206 which prevents the customer or anyone without the security tool from having access to the underneath side of the fiber splice interconnect bracket assembly 220. A splice shelf 403 (FIG. 4A) is provided on the underneath side of the fiber splice interconnect bracket assembly 220. The fiber splice interconnect bracket assembly 220 as shown is designed in a manner to accept subscriber output covers 209 to limit access to a specific set/group of connectors. The provider cover 203 is secured to the fiber splice interconnect bracket assembly 220 with hardware. Furthermore, a lock 202 may be provided for each subscriber cover for additional security. This unique feature prevents the end user customer or technicians from competing companies from having access to specific group of connectors and adapters unless they authorized and are allowed access.

A plurality of screws 211 secure the inner chassis 200 to the enclosure box 103. FIG. 2 only shows one screw 211; however, another screw on the opposite side is visible in FIG. 3D.

Elements 207 and 208 correspond to fiber management routing rings. These rings are installed in a "racetrack" arrangement and are used to store excess fiber slack that is needed for future splicing needs.

Figure 3A:
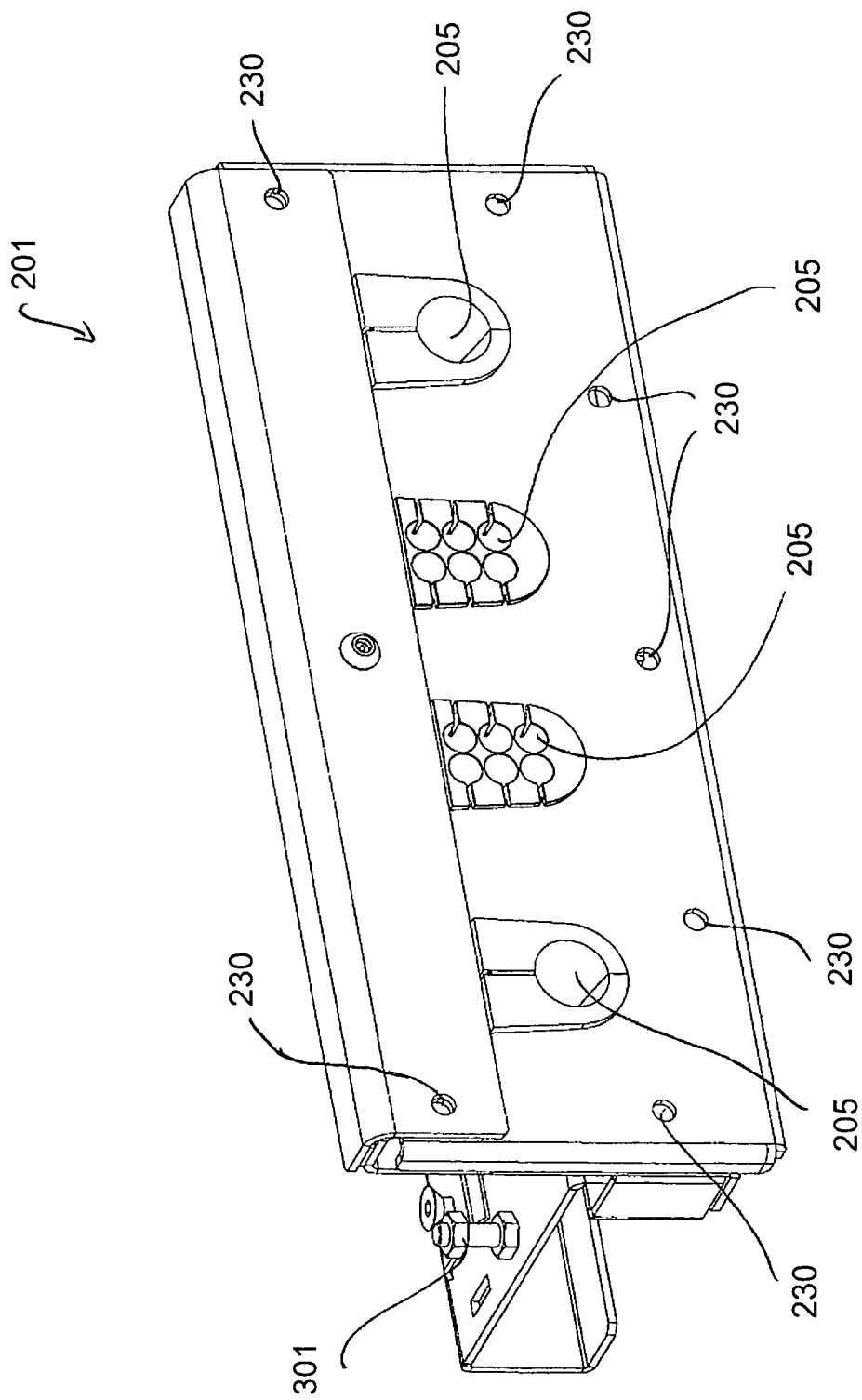
FIGS. 3A, 3B, and 3C illustrate exemplary configurations of a cable port mounting plate.
Figure 3B:
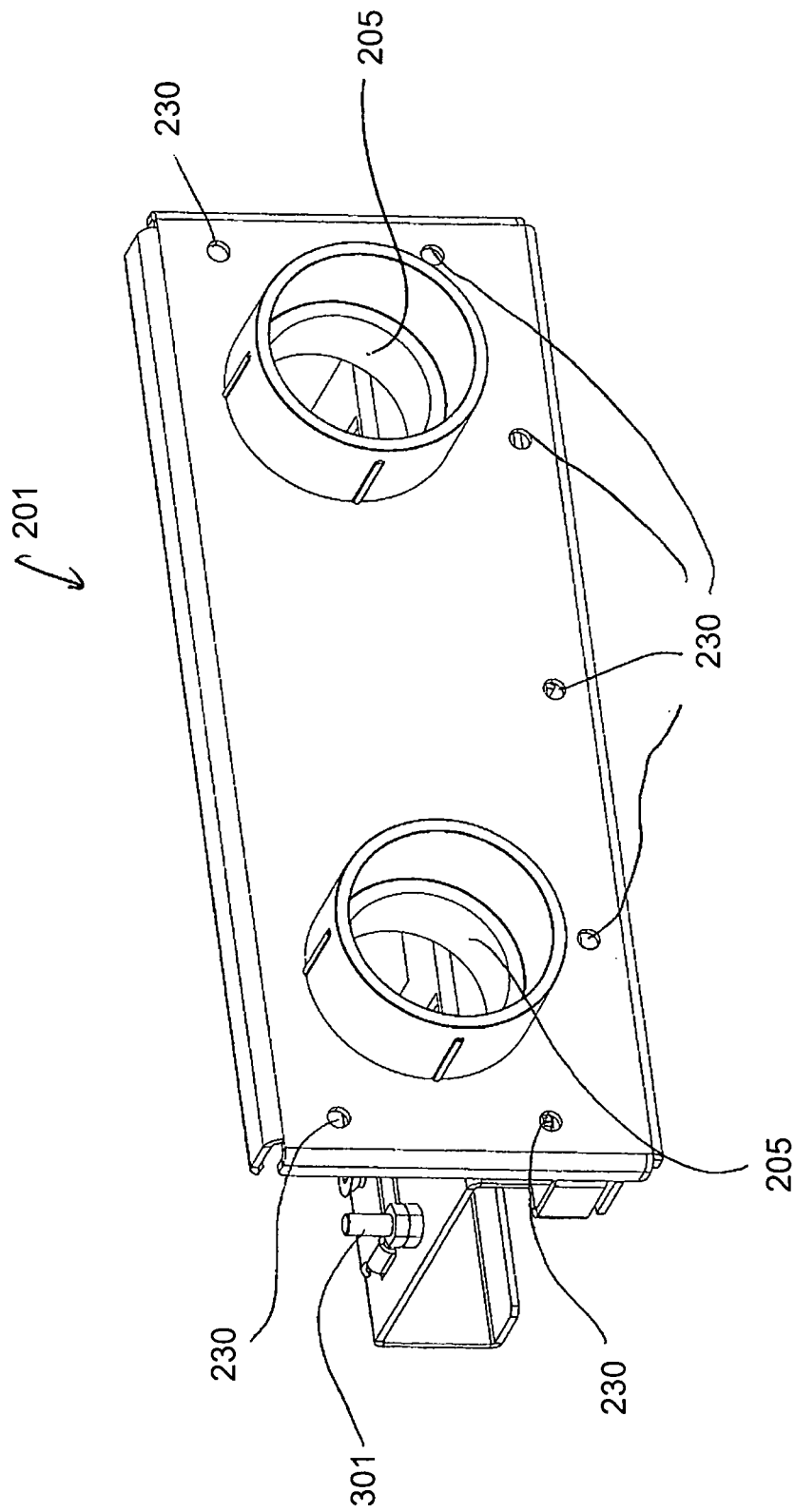
Figure 3C:
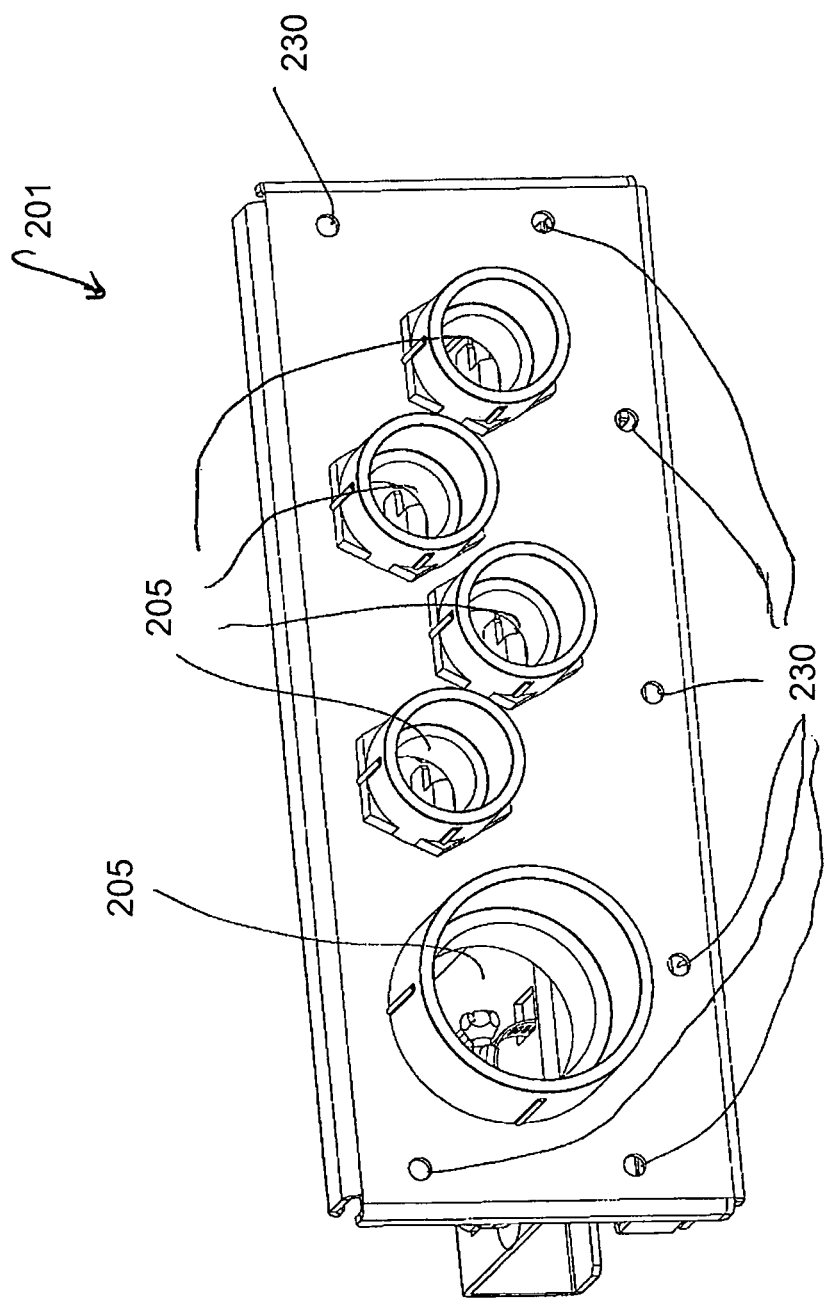

FIGS. 3A, 3B, and 3C illustrate exemplary configurations for the cable port mounting plate 201. In FIG. 3A, the cable port mounting plate 201 includes four grommets (holes). The center two grommets include a plurality of holes 205. Furthermore, a plurality of grounding studs 301 may be provided on the cable port mounting plate 201. In FIG. 3A, only one of the plurality of grounding studs is visible.

FIG. 3B illustrates an alternative configuration of the cable port mounting plate 201 in which two holes 205 are provided. Similarly, FIG. 3C illustrates a further alternative configuration of the cable port mounting plate 201. Each of the cable port mounting plates 201 have holes through which screws can be inserted to secure the cable port mounting plates 201 to the inner chassis 200 and enclosure box 103. FIG. 1B shows an example, in which the cable port mounting plate 201 is removably fastened to the enclosure box 103 using screws 204.

Figure 3D:
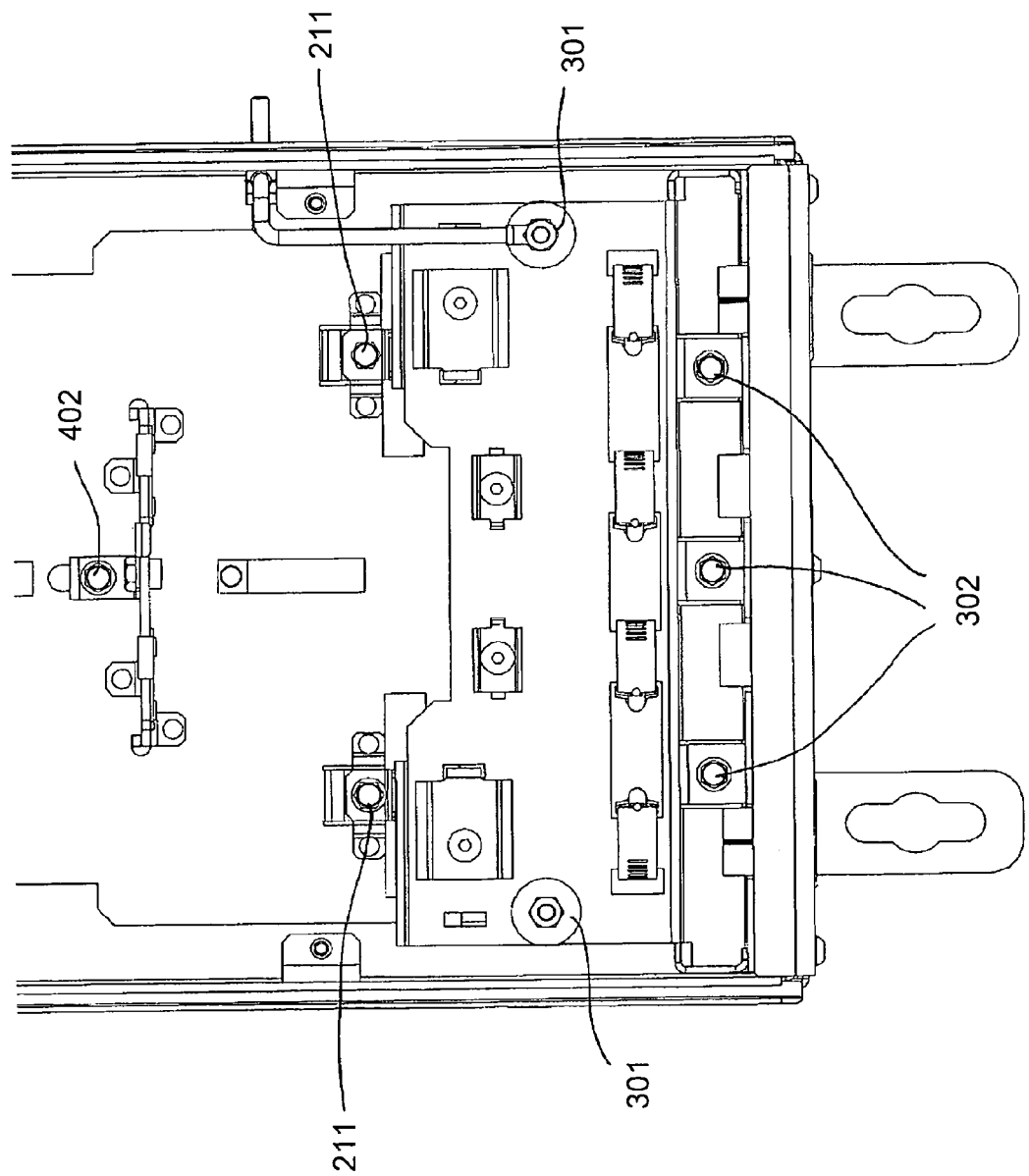
FIG. 3D illustrates a partial top view of the internal chassis.

FIG. 3D illustrates a top-view of a portion of the inner chassis 200. In FIG. 3D, the cable port mounting plate 201 is removably fastened to the inner chassis through screws 302. Furthermore, two grounding studs 301 are provided on the cable port mounting plate 201.

The cable port mounting plate 201 is removably fastened in the above manner to allow flexibility and so that it can be changed based on the designer's choice.

Furthermore, the fiber splice enclosure 100 provides the capability of removing the internal chassis 200 from the enclosure box 103. Specifically, the internal chassis 200 is removably mounted to the enclosure box 103 through screws 211. This feature facilitates fiber optic component splicing and interconnect by allowing the work area to be moved to a more ergonomic location. This unique design feature also provides a means to replace the outer enclosure if desired because of damage or other without interruption in customer service.

Figure 4A:
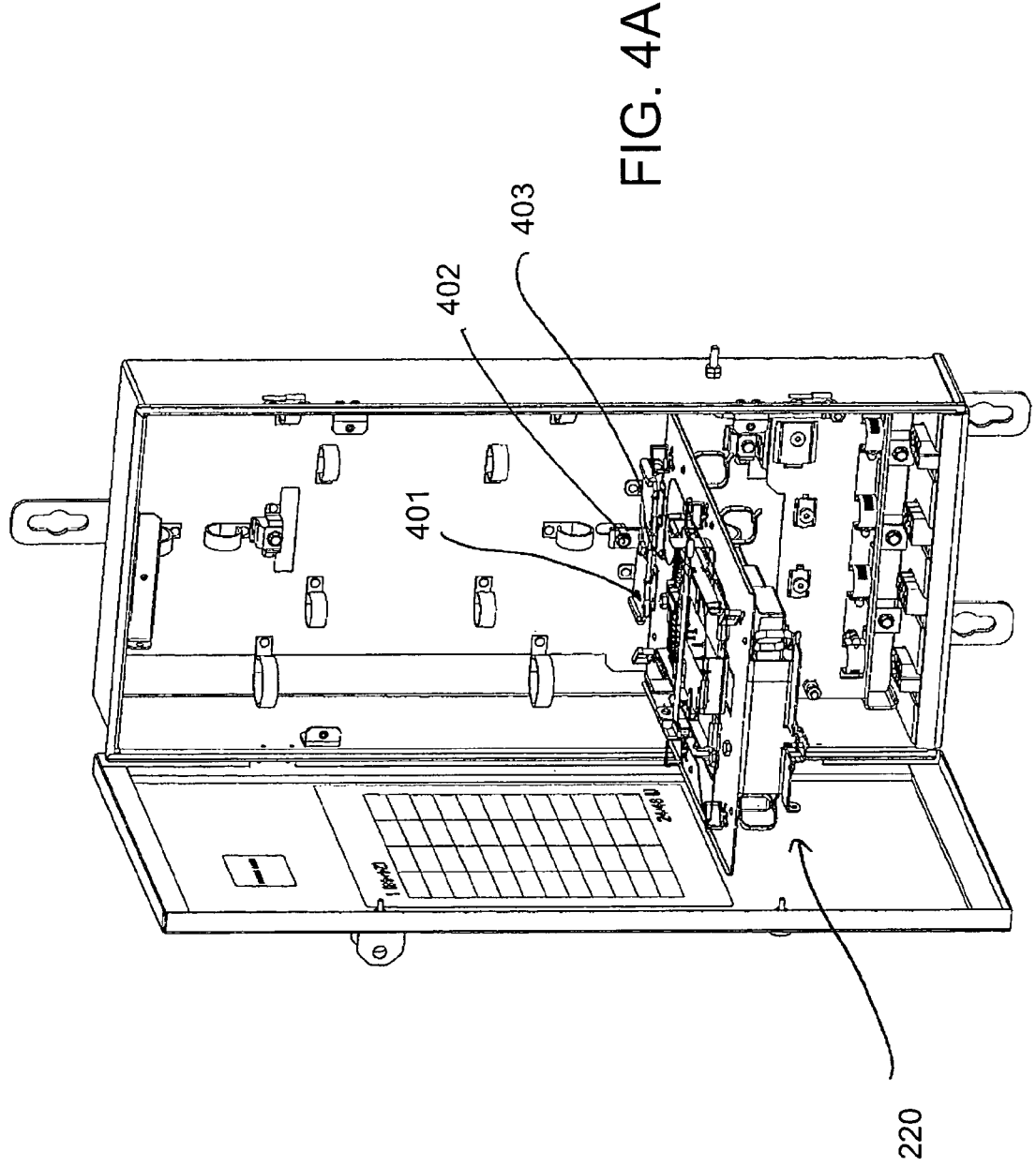
FIG. 4A illustrates another perspective view of the exemplary fiber splice enclosure.

FIG. 4A illustrates another perspective view of the fiber splice enclosure 100 described above. As described with reference to FIG. 4A, the fiber splice enclosure 100 further includes a fiber splice interconnect bracket assembly 220, which includes a splice shelf 403 for mounting or storing of splice trays 409 as needed during splicing and storage operations. As seen in FIG. 4A, the fiber splice interconnect bracket assembly 220 hinges on a mounting bracket 401. This makes it easier for service personnel to perform splicing and maintenance on the unit by providing a fixed support plate to use when needed. FIGS. 4B and 4C illustrate perspective views of the mounting bracket 401. Slip hinges 404 are provided on the mounting bracket so that the fiber splice interconnect bracket assembly 220 may be hingedly mounted to the mounting bracket 401. A stability screw 402 may also be provided to removably fasten the inner chassis 200 to the enclosure box 103. It will be seen from FIG. 4B that the stability screw 402 is provided with a slight tolerance so that the inner chassis may float. A keeper bracket 410 is removably fastened to the mounting bracket 401 to secure the fiber splice interconnect bracket assembly 220. The fiber splice interconnect bracket assembly 220 includes a tab 221, as shown in FIGS. 4D and 4F.

Figure 4D:
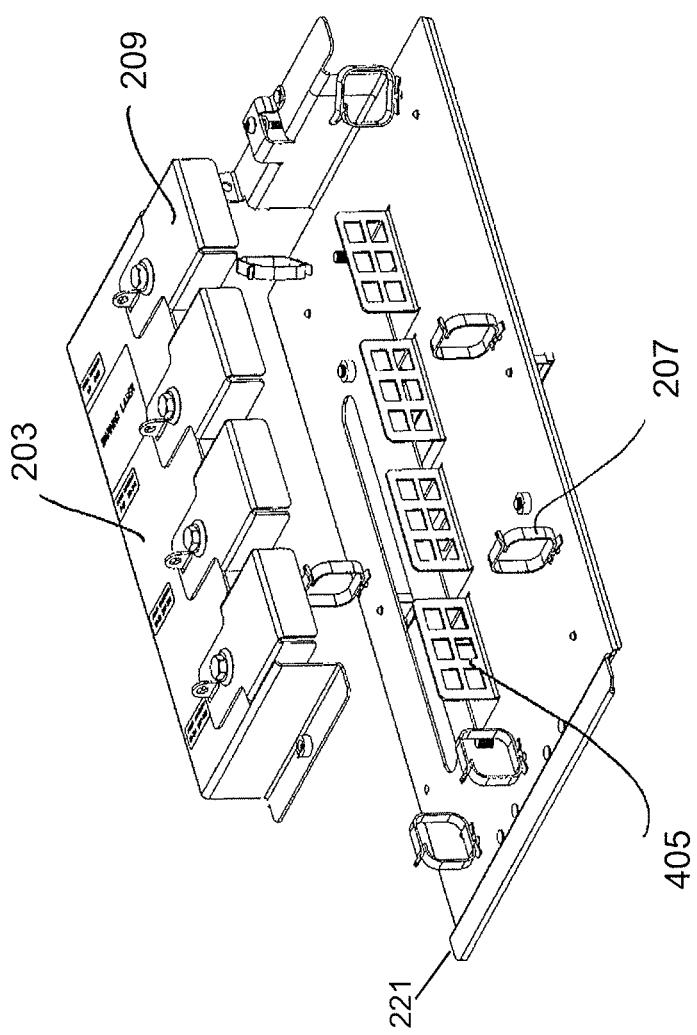
FIGS. 4D and 4E describe the top side of the interconnect bracket assembly.
Figure 4E:
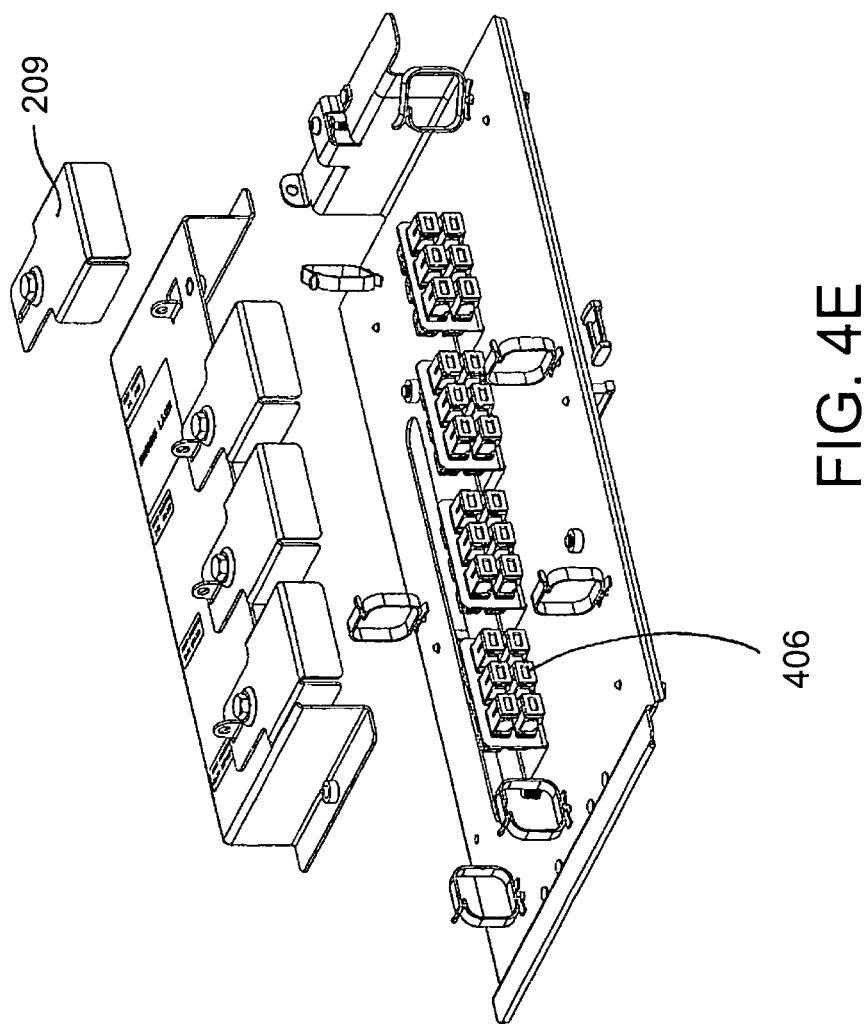

FIGS. 4D and 4E provide further details on the top side of the fiber splice interconnect bracket assembly 220. The fiber splice interconnect bracket assembly 220 as shown, groups the fiber output cables in an organized and methodical arrangement in a plurality of groups of six openings 405 for adapters and cables 406. It should be noted that the number of openings is not limited to six and a number of a different configurations is possible. As discussed earlier, a provider cover 203 and subscriber cover 209 are provided on the input side and on the output side, respectively. These covers are attached with hardware that can only be accessed when the interconnect bracket is open. This arrangement provides a means for partitioning one or more sets of connectors (adapters and cables) as needed. These openings may be populated with SC style adapters or LC style adapters or any other type or combination of connectors commonly used and known to one skilled in the art.

Figure 4F:
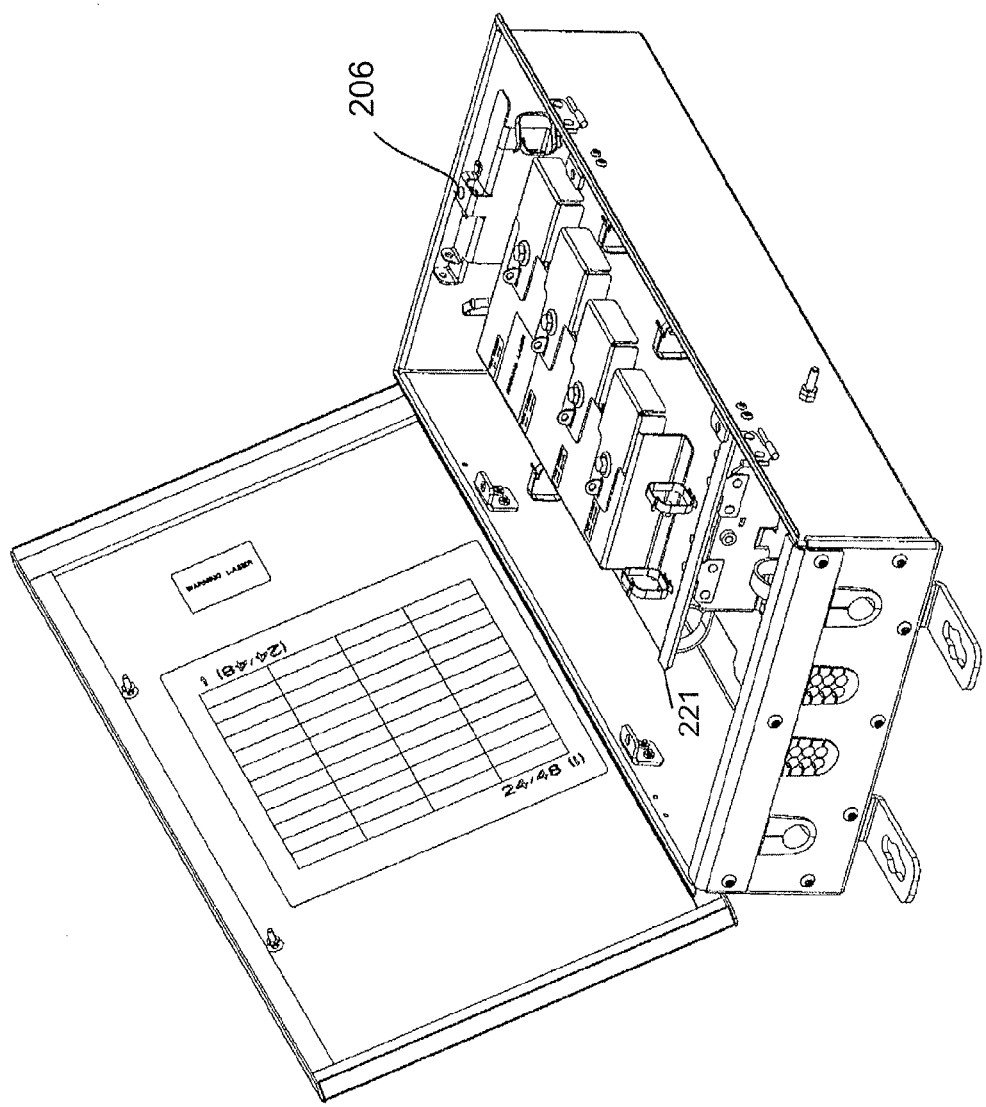
FIG. 4F illustrates a perspective view of the exemplary fiber splice enclosure box with the interconnect bracket assembly in a closed position.

FIG. 4F illustrates a perspective view of the fiber splice enclosure 100 when the fiber splice interconnect bracket assembly 220 is in the closed position and secured to the internal chassis by the screw 206.

Figure 4G:
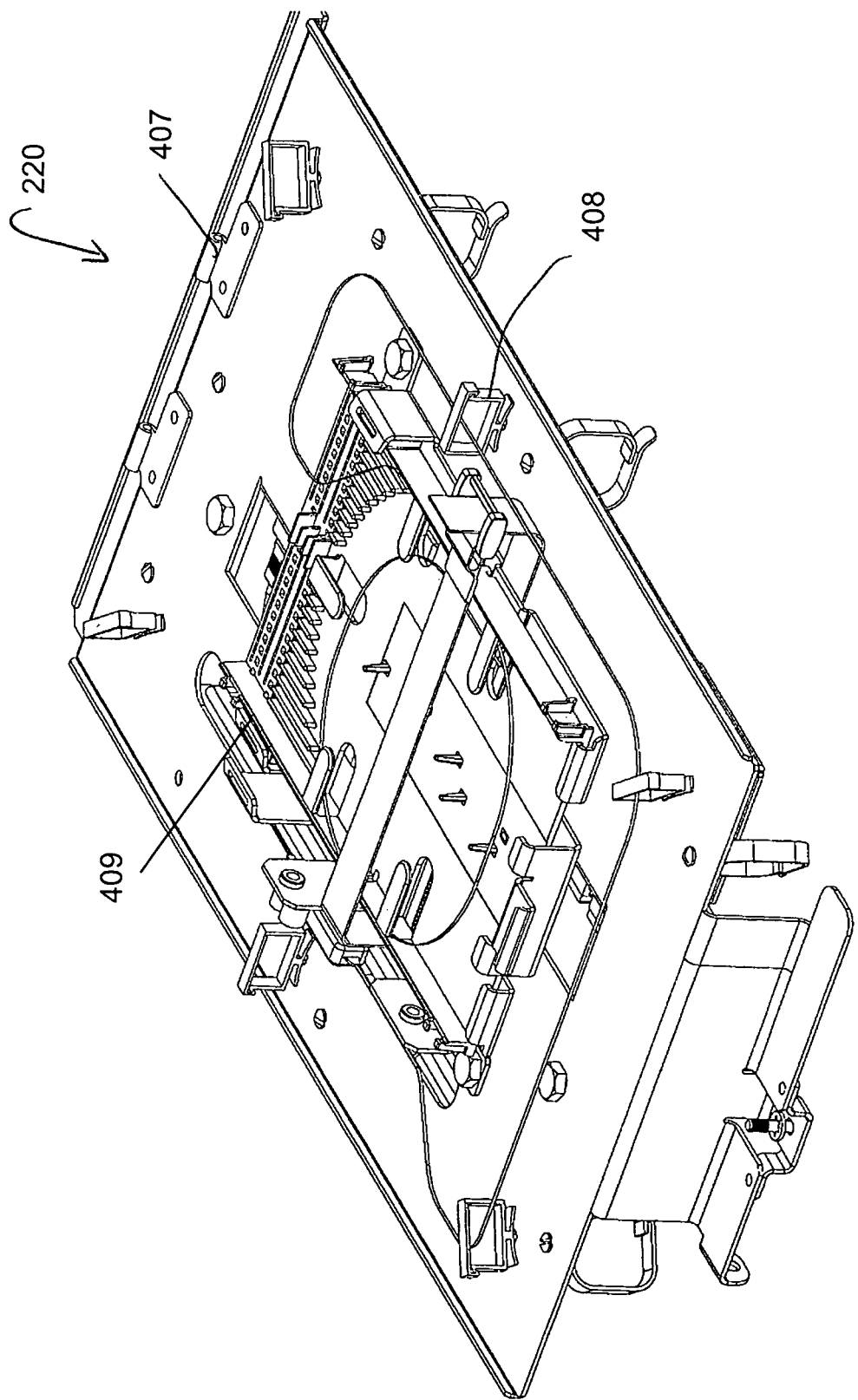
FIG. 4G describes an underneath side of the interconnect bracket assembly.

FIG. 4G illustrates an underneath side of the fiber splice interconnect bracket assembly 220. As seen from FIG. 4G, additional fiber management routing rings 408 may be provided on an underneath side of the fiber splice interconnect bracket assembly 220. Furthermore, hinges 407 are provided so that the fiber splice interconnect bracket assembly 220 can be mounted on the mounting bracket 201 through the hinges 404.

Figure 5:
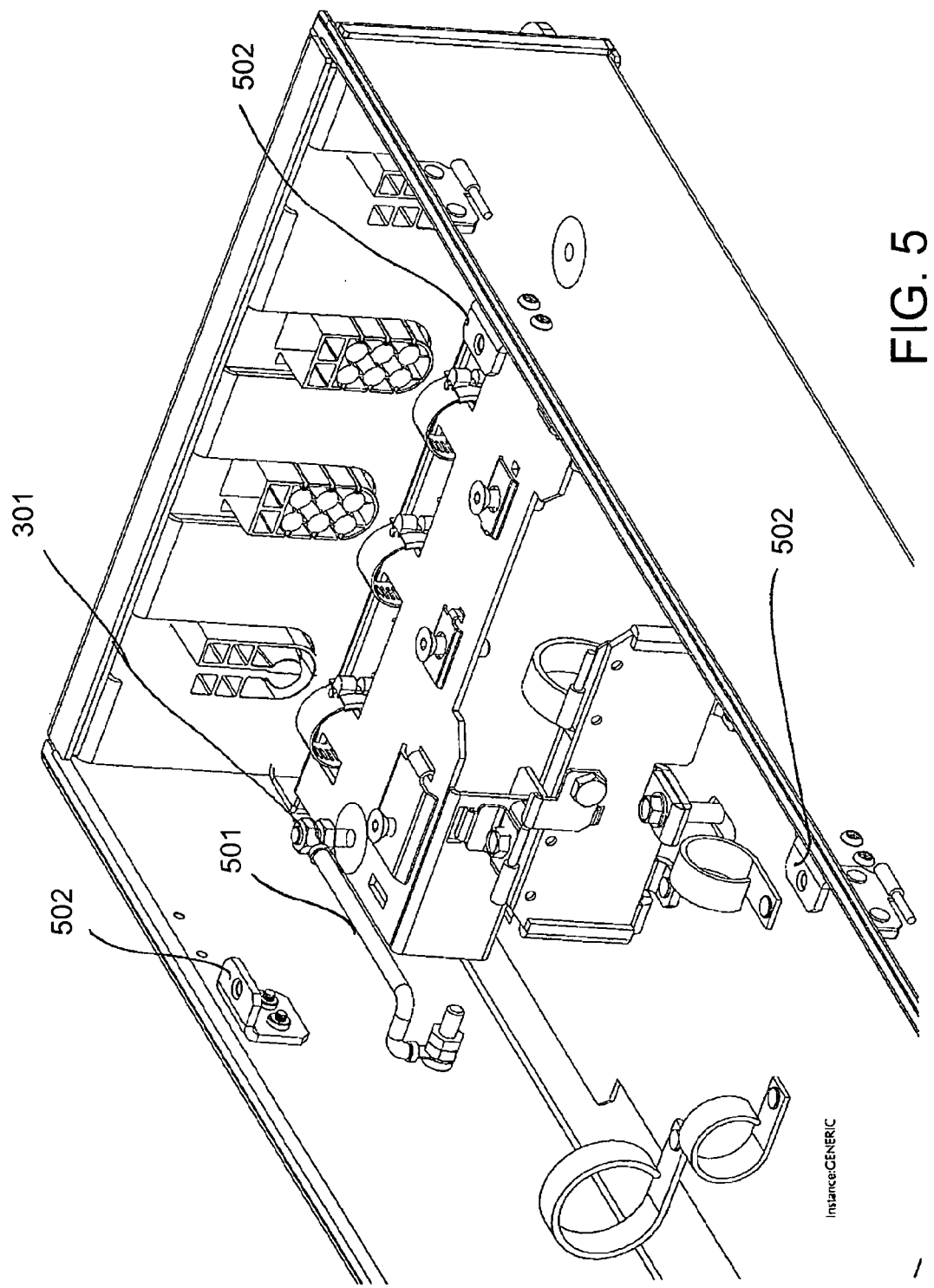
FIG. 5 illustrates an exemplary tethered ground wire system for the exemplary fiber splice enclosure.

FIG. 5 illustrates additional features of fiber splice enclosure 100. The fiber splice enclosure 100 may include a tethered contiguous ground system that maintains continuity through out door to chassis to enclosure to earth ground. A tethered ground cable 501 may be installed between the cable port mounting plate 201 and the enclosure box 103. This allows the inner chassis 200 to be removed from the enclosure without disconnecting grounding and bonding. Also another ground cable (not shown) may be provided that connects the internal chassis 200 to the enclosure box 103.

Further, the fiber splice enclosure 100 is designed to mount the cover 101 (see FIG. 1) in either left or right hand configuration. This is made possible by providing multiple screw openings 502 and slip hinges 105 on both sides of the enclosure box 103.

One of the advantages of the design presented above is that it is modular and upgradeable. The cable port mounting plate 201, door 101, and inner chassis 200 may be modified/changed without the use of extensive rework or field metal alterations.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A fiber splice enclosure comprising:
an enclosure;
a chassis;
a cover; and
a cable port mounting plate, wherein the cable port mounting plate includes openings for allowing entry and exit of cables,
wherein said cable port mounting plate is configured to be removably fastened to the enclosure with a fastener and removably fastened to the chassis,
wherein the chassis includes a mounting bracket secured to the chassis and a fiber splice interconnect bracket assembly hingedly mounted to the mounting bracket, pivotable between a closed position and an open position,
wherein the fiber splice interconnect bracket comprises a tab for supporting the fiber splice interconnect bracket assembly in a fixed position, the tab extending beyond a hinge of the fiber splice interconnect bracket assembly,
wherein the fiber splice interconnect bracket assembly includes a splice shelf including at least one splice tray on one side of the interconnect bracket assembly,
wherein the enclosure comprises at least one hinge provided on a sidewall thereof through which the cover is mounted to the enclosure thereby allowing the cover to pivot between an open position and a closed position, and
wherein a rotational axis of the hinge mounting the fiber splice interconnect bracket assembly to the mounting bracket is substantially perpendicular to a rotational axis of the at least one hinge of the enclosure.

2. The fiber splice enclosure of claim 1, wherein the enclosure provides a plurality of slip hinges and screw holes on each of a pair of opposite side walls thereof to facilitate mounting of the cover on either of the opposite side walls.

3. The fiber splice enclosure of claim 1, wherein the chassis is removably fastened to the enclosure.

4. The fiber splice enclosure of claim 1, further including a ground terminal provided on the enclosure, wherein the ground terminal is connected to a grounding contact on the first cable port mounting plate through a ground cable removably connected to the grounding contact.

5. The fiber splice enclosure of claim 4, wherein the grounding contact is a stud.

6. The fiber splice enclosure of claim 1, wherein the fiber splice interconnect bracket assembly includes a plurality of openings provided on an opposite side thereof, wherein the plurality of openings are configured for mounting adapters.

7. The fiber splice enclosure of claim 6, wherein a subscriber cover is provided to secure access to the plurality of openings.

8. The fiber splice enclosure of claim 7, wherein the subscriber cover is secured by a lock to secure access to the plurality of openings.

9. The fiber splice enclosure of claim 1, wherein the open position of the fiber splice interconnect bracket assembly is no more than 90 degrees from the closed position.

10. The fiber splice enclosure of claim 9, wherein the fiber splice interconnect bracket assembly is substantially perpendicular to the mounting bracket in the closed position.

* * * * *